March 14, 1950 G. G. BRUCK ET AL 2,500,795
COMBINED TRANSMITTER-RECEIVER FOR RADIO COMMUNICATION SYSTEMS
Filed Nov. 2, 1946
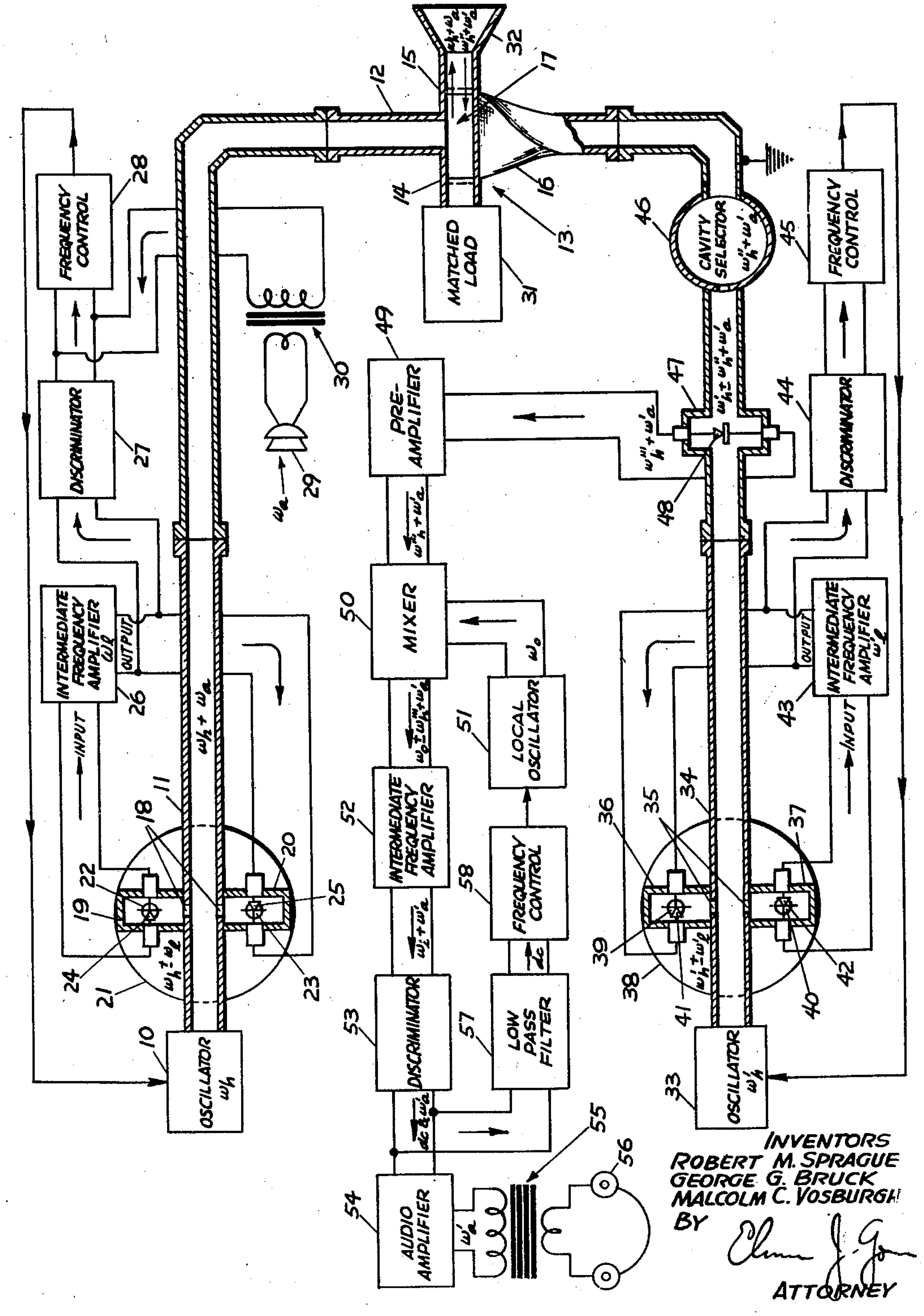
INVENTORS
ROBERT M. SPRAGUE
GEORGE G. BRUCK
MALCOLM C. VOSBURGH
BY
ATTORNEY Patented Mar. 14, 1950 2,500,795

UNITED STATES PATENT OFFICE 2,500,795

COMBINED TRANSMITTER-RECEIVER FOR RADIO COMMUNICATION SYSTEMS

George G. Bruck, Farmingdale, N. Y., and Robert M. Sprague, Waban, and Malcolm C. Vosburgh, Cambridge, Mass., assignors to Raytheon Manufacturing Company, Newton, Mass., a corporation of Delaware Application November 2, 1946, Serial No. 707,514

5 Claims. (Cl. 250—9)

This invention relates to radio communication systems, and, more particularly, to the terminal stations for a frequency modulated, radio communication system comprising, for example, two widely separated terminal stations and a plurality of intermediate relay stations, all operating on different mean carrier frequencies, the system permitting two-way transmission of intelligence between any and all of the stations included therein, with the carrier wave emanating from one of the terminal stations and from each intermediate relay station, hereinafter referred to as the slave stations, under the control of the carrier wave received at each such station, and all under the control of the carrier wave originating at the remaining terminal station, hereinafter referred to as the master station.

A communication system having the foregoing characteristics is disclosed in the copending application of George G. Bruck, Philip E. Volz, Paul J. Pontecorvo and Malcolm C. Vosburgh, entitled "Radio communication systems," Ser. No. 650,716, filed February 27, 1946, now Patent No. 2,475,474, dated July 5, 1949. However, for certain purposes, said system is inadequate. For example, it cannot be used for simultaneous two-way transmission because its transmitting and receiving channels are not isolated from each other, as a result of which any intelligence originating at any given station in the system is heard at that same station. Obviously, if said station is receiving intelligence at the same time that it is being used for transmission, the incoming and outgoing signals mix, and both become unintelligible.

It is, therefore, the main object of the present invention to provide a communication system of the type above referred to in which the transmitting and receiving channels of each station are so divorced from each other as to permit their simultaneous use without interference.

This, and other objects of the present invention, which will become more apparent as the detailed description thereof progresses, are attained, briefly, in the following manner:

Throughout the remainder of this specification it will be assumed that the system comprises merely two widely separated terminal stations, with no intermediate relay stations, and with both of said terminal stations functioning as master stations.

At the first master station, to a description of which this specification will be limited for the time being, there is separately generated two carrier waves having a predetermined frequency difference therebetween. For example, one locally-generated carrier wave may have a frequency of 10,000 megacycles per second and the other 10,082 megacycles. Appropriate wave-guide apparatus is provided, consisting of two, for example, electromagnetically isolated channels, one of which will be utilized for the transmission of one of said locally-generated carrier waves, say the one having a frequency of 10,000 megacycles, and the other channel for the reception of a remotely-generated carrier wave, say from the slave station. Said remotely-generated carrier wave, which may have, for example, a frequency of 10,020 megacycles per second, and the locally-generated carrier wave of 10,082 megacycles, in said receiving channel, are combined to produce a subcarrier wave of 62 megacycles as will be presently explained.

Both of said locally-generated carrier waves are stabilized by apparatus described and disclosed in the copending application of George G. Bruck, entitled "Frequency stabilizing device," Ser. No. 660,597, filed April 9, 1946, now Patent No. 2,468,029 dated April 26, 1949. Therefore, only a brief statement of the related use of said apparatus in connection with the system of the present invention will be considered necessary.

For the present there will be described the means utilized to stabilize, for example, the transmitting channel. From appropriate wave-guiding apparatus, there is derived from the related carrier wave, two carrier-wave portions of like phase. One of these carrier-wave portions is mixed with an intermediate-frequency wave to produce sideband waves, said intermediate-frequency wave being generated by a novel oscillation generator, disclosed in aforesaid copending application Ser. No. 660,597. The other carrier-wave portion is mixed with one of said side-band waves to recover said intermediate-frequency wave. The two mixing devices may comprise non-linear impedances, such as crystals.

Said mixing devices are connected, respectively, to the output and input circuits of a broad-band amplifying device, the center frequency of which corresponds to the frequency of the aforementioned intermediate-frequency wave. This amplifying device is caused to oscillate and produce said intermediate-frequency wave by positive feedback between its output and input circuits, said feedback being obtained by interposing between the mixing devices connected, respectively, to said output and input circuits, a tuned circuit, for example, a cavity resonator, which is resonant to one of the sideband waves produced by the combination of the first above mentioned carrier-wave portion and said intermediate-frequency wave.

A portion of said intermediate-frequency wave is applied to means, such as a frequency discriminator, for deriving from said intermediate-frequency wave, a unidirectional output whose amplitude and sense are functions, respectively, of the magnitude and sense of any deviation of the frequency of said intermediate-frequency wave from its initial frequency.

Said unidirectional output is applied to appropriate means for altering the frequency of the locally-generated carrier wave to compensate for said frequency deviation. In the absence of locally-generated intelligence, said unidirectional output is developed merely as a result of random drift in the frequency of the locally-generated carrier wave, and serves to stabilize the carrier-wave generator. However, said unidirectional output also varies in response to any locally-generated intelligence, and its application to the carrier-wave generator, therefore, serves also to frequency modulate said generator, the resulting frequency-modulated carrier wave being radiated into space.

With the exception of the application of locally-generated intelligence, the stabilizing means above described are duplicated in the receiving channel.

An incoming carrier wave, say from a second master station, which may or may not include remotely generated intelligence, is applied to a high-Q circuit in the receiving channel, for example, a cavity resonator, tuned to the frequency of said incoming carrier wave to reduce, to a minimum extraneous signals and to isolate, electromagnetically, the locally-generated carrier wave in the transmitting channel. The output of this circuit and the locally-generated carrier wave in the receiving channel are mixed to derive a sub-carrier wave whose mean frequency is an arithmetic function of the frequencies of the incoming carrier wave and the locally-generated carrier wave. Said last-named mixing device may be a non-linear impedance, such as a crystal.

Said sub-carrier wave is applied to an amplifier and from said amplifier to a mixing circuit. To this mixing circuit is also applied the output of a local oscillator, whose frequency, when combined with the frequency of said sub-carrier wave, produces an intermediate-frequency. The intermediate-frequency output from said mixer is applied to a broad-band amplifier, resonant to said intermediate-frequency wave. The output of said broadband amplifier is applied to a device, such as a discriminator, to extract therefrom any remotely-generated intelligence, said intelligence being amplified and reproduced in a suitable manner.

Means are also provided in the aforementioned circuit for stabilizing said intermediate-frequency wave in the event of any random drift in the frequency of the locally or remotely-generated carrier waves. With no drift from the predetermined center frequency of the carrier waves employed, the output of the discriminator will be the intelligence extracted therefrom. However, should a deviation of frequency occur, there will be derived from the discriminator, a unidirectional output whose amplitude and sense are functions, respectively, of the magnitude and sense of said frequency deviation. The output thus obtained is applied to any appropriate device, electronic or mechanical, for altering the frequency of the local oscillator to compensate for any frequency deviation in said locally or remotely-generated carrier waves.

Both transmitting and receiving channels or wave guides are connected to an electromagnetic radiator, for example, an electromagnetic horn, through a wave-guide device, such as a "magic T," the properties of which are described in connection with a copending application of George G. Bruck, entitled "Mixing apparatus," Serial No. 652,628, filed March 7, 1946, now Patent No. 2,468,166, dated April 26, 1949. Said electromagnetic horn is adapted to radiate and receive electromagnetic energy separately or simultaneously.

At the second master station, the equipment thus far described is duplicated except that the locally-generated carrier wave of the transmitting channel in said second master station is the received carrier wave of 10,020 megacycles per second described in connection with the master station. Therefore, the locally-generated carrier wave in the receiver channel of said second master station may have a frequency of 10,062 megacycles per second which when combined with the received carrier wave of 10,000 megacycles per second of the first master station will likewise produce a sub-carrier wave of 62 megacycles per second as described hereinbefore.

In the accompanying specification there shall be described, and in the annexed drawing shown, an illustrative embodiment of the terminal station of the present invention. It is, however, to be clearly understood that the present invention is not to be limited to the details herein shown and described for purposes of illustration only, inasmuch as changes therein may be made without the exercise of invention, and within the true spirit and scope of the claims hereto appended.

In said drawing, the single figure is a partial block, partial schematic diagram of a terminal station assembled in accordance with the principles of the present invention.

Referring now to the aforesaid illustrative embodiment of the present invention, with particular reference to the drawing illustrating the same, the numeral 10 designates an oscillator for generating a carrier wave $\omega_h$, preferably, in the microwave region of the electromagnetic spectrum, having a frequency, for example, of 10,000 megacycles per second. The output of the oscillator 10 is applied to an energy-transmission system, for example, a wave guide 11, at the outer end of which there is connected the so-called "E" arm 12 of a wave-guide assembly 13, known as a "magic T," said assembly including, in addition, a side branch 14, another side branch 15 collinear with said first side branch, and a so-called "H" arm 16, extending at right angles to both said side branches and said "E" arm, said side branches and said "E" and "H" arms extending from a common junction 17. As shown in the drawing, the "H" arm 16 recedes from the observer a short distance from the junction 17, then bends downwardly, and is then twisted through an angle of 90°.

By means of suitable coupling devices, such as a pair of openings 18, two carrier wave portions of like phase are fed from the wave guide 11 into a pair of wave-guide sections 19 and 20. The wave-guide sections 19 and 20 also communicate with a cavity resonator 21, respectively, through openings 22 and 23, said cavity resonator being tuned to a sideband wave having a frequency which is either the sum of or the difference between the frequency of the carrier wave $\omega_h$, generated by the oscillator 10, and the frequency of an intermediate-frequency wave $\omega_I$, generated as will hereinafter be more fully explained. Assuming that the intermediate-frequency wave has a frequency of 40 megacycles per second, the cavity resonator 21 may be tuned to a frequency of either 10,040 megacycles per second or 9,960 megacycles per second. For the purposes of this specification, it will be assumed that the cavity resonator is tuned to the frequency of the upper sideband $\omega_h+\omega_I$.

Disposed in the wave-guide sections 19 and 20 are non-linear impedance devices, for example, crystals 24 and 25, the former being connected to the input terminals of an amplifying device 26, and the latter being connected to the output terminals of said device.

Assuming for the moment that the amplifying device 26 is feeding an intermediate-frequency wave $\omega_I$ to the crystal 25, said intermediate-frequency wave will combine with the carrier wave $\omega_h$ entering the wave-guide section 20 from the wave guide 11 to produce sideband waves $\omega_h\pm\omega_I$. The upper sideband wave thus produced will enter the cavity resonator 21, which is tuned thereto, and will pass from said cavity resonator to the wave-guide section 19 to excite the crystal 24. The latter will also be excited by the carrier wave portion $\omega_h$ entering the wave-guide section 19 from the wave guide 11 to reproduce, across the crystal 24, the intermediate-frequency wave $\omega_I$. The latter, being applied to the input terminals of the amplifying device 26, will cause the cycle just described to continue, provided the energy fed back from the output terminals of the amplifying device to the input terminals thereof is of the proper phase to sustain oscillation.

If the frequency of the carrier wave $\omega_h$ changes, due to random drift of the oscillator 10, the frequency of the intermediate-frequency wave $\omega_I$, generated by the oscillating amplifying device 26, will change a proportionate amount.

In order to utilize any change in the frequency of the intermediate-frequency wave $\omega_I$ to stabilize the oscillator 10, a portion of the output of the amplifying device 26 is applied to a conventional frequency discriminator 27 whose center frequency corresponds to the initial or normal frequency of the intermediate-frequency wave, and as the frequency of said intermediate-frequency wave varies in response to deviations from the initial or normal frequency of the carrier wave, a unidirectional output is produced having an amplitude and sense which are functions, respectively, of the magnitude and sense of said frequency deviation.

Said unidirectional output is applied to any appropriate control device 28 designed, in turn, to retune the oscillator 10 so as to compensate for the aforesaid frequency deviation. In addition, said unidirectional output may be caused to vary, in response to a source of locally-generated intelligence, for example, a microphone 29, which is coupled to the frequency control device through an audio-frequency transformer 30. The application of said intelligence to the frequency control device 28 serves to frequency modulate the oscillator 10.

The resulting frequency-modulated carrier wave travels through the wave guide 11, then into the "E" arm 12 of the "magic T" 13. At the junction 17, said carrier wave $\omega_h$ plus the intelligence $\omega_a$ is split into two constituent waves, one of said constituent waves travelling along the side branch 14 to an energy-absorbing device, such as a matched load 31, and the other constituent wave traveling along the side branch 15 and thence into an electromagnetic radiator, for example, and electromagnetic horn 32, from whence said constituent carrier wave is radiated into space, say in the direction of a second master station (not shown).

With the exception of the means for applying locally-generated intelligence to the frequency control device 28, the means for stabilizing the locally-generated carrier wave, generated by an oscillator 33 connected to the receiving channel, is duplicated, in said channel. The locally-generated carrier $\omega_h$ of the oscillator 33, which may have a frequency, for example of 10,082 megacycles per second, enters a wave guide 34 and by means of coupling devices, such as a pair of openings 35, two carriers wave portions $\omega'_h$ of like phase enter two wave-guide sections 36 and 37. Said wave-guide sections also communicate, respectively, with a cavity resonator 38, through a second pair of openings 39 and 40, said cavity resonator being tuned to a sideband wave having a frequency which is either the sum of or the difference between the frequency of the locally-generated carrier wave $\omega'_h$ and the frequency of an intermediate-frequency wave $\omega'_I$, generated as hereinbefore described in connection with the first portion of the system of the present invention. The frequency of the intermediate-frequency wave $\omega'_I$ is also 40 megacycles per second and the cavity resonator 38 is tuned to the upper sideband $\omega'_h+\omega'_I$ which, therefore, will have a frequency of 10,112 megacycles per second.

As in the first part of the system, namely, the transmitting portion, a pair of non-linear impedance devices 41 and 42, such as crystals, are disposed in the wave-guide sections 36 and 37, the first-named crystal being connected to the input terminals of an amplifying device 43, and the second-named crystal being connected to the output terminals of said device. The same mixing action, as previously explained, takes place in the wave-guide sections 36 and 37 to produce across the crystal 41 the intermediate-frequency $\omega'_I$. The same cycle of events, as hereinbefore described, will occur to bring about sustained oscillation, etc.

Any change in the frequency of the carrier wave $\omega'_h$ will be compensated for as a result of a unidirectional output from a discriminator 44, which is fed to a frequency control device 45 for maintaining the frequency of oscillator 33 constant.

An incoming carrier wave $\omega''_h$, may have a frequency of 10,020 megacycles per second, plus any intelligence $\omega'_a$ is received by the electromagnetic horn 32 and conducted along the side branch 15 to the junction 17 of the "magic T" 13. At the junction 17, the carrier wave $\omega''_h$ splits into two constituent waves, the energy of one of said waves travelling along the "E" arm 12, where it is dissipated because of the matched load, as represented by the oscillator 10. The other constituent wave travels along the "H" arm 16 to a cavity resonator 46, disposed in the wave guide 34 between the "magic T" 16 and a wave-guide section 47. The cavity resonator 46 is tuned to the incoming carrier wave $\omega''_h$ and serves the dual purpose of selecting said carrier wave and electromagnetically isolating any possible leakage of energy of the carrier wave $\omega_h$, generated by the oscillator 10, into the wave-guide section 47 where it may damage a crystal 48 disposed therein.

In the wave-guide section 47, the incoming carriers $\omega''_h$ and $\omega'_h$ are combined to derive a sub-carrier wave $\omega'''_h$ having a frequency of 62 megacycles per second. The expression sub-carrier wave is used since the non-linear device or crystal 48 is responsive to the frequency difference between the carrier waves $\omega'_h$ and $\omega''_h$. This so-called sub-carrier wave is applied to a preamplifier 49 and the output thereof is in turn conducted to a mixer stage 50. Also applied to said mixer stage 50 is the output wave $\omega_o$ of a local oscillator 51 having a frequency, for example, of 45 megacycles per second. The combined input waves $\omega'''_h$ and $\omega_o$ are mixed in the stage 50 to produce an intermediate-frequency wave $\omega_i$ which may be the sum or difference of said combined input waves. In this particular embodiment the difference frequency of 17 megacycles per second was selected. The output from said mixer 50 is then conducted to a broad-band amplifier 52, responsive to said difference in frequency between $\omega'''_h$ and $\omega_o$ or the intermediate-frequency wave $\omega_i$. The output of said amplifier 52 is now applied to a conventional discriminator stage 53 where, in the absence of any frequency deviation of the carrier waves $\omega'_h$ or $\omega''_h$, the usual action of extracting the intelligence $\omega'_a$ takes place, said intelligence being applied to an audio-frequency amplifier 54, thence through an audio-frequency transformer 55, the output of which is applied to phones 56 to reproduce audibly the intelligence $\omega'_a$.

In the event of a random deviation from the initial carrier wave frequencies $\omega'_h$ or $\omega''_h$, a unidirectional output *dc* is developed, in addition to the intelligence $\omega'_a$ present in the discriminator stage 53, and is applied to a low pass filter stage 57. In this stage the intelligence $\omega'_a$ is by-passed and the unidirectional output *dc* is passed and applied to any type of frequency control 58, either electronic or mechanical. The output of said frequency control is subsequently applied to the local oscillator 51 to compensate for the deviation of frequency of the carrier waves $\omega'_h$ or $\omega''_h$ and thus maintains the intermediate-frequency wave $\omega_i$ constant.

At the second master station (not shown), the equipment thus far described is duplicated. The only departure in the operation of the second station is the value of the frequency of the locally-generated carrier waves. This was explained in the opening paragraph of the present specification. Thus, either station may be operated as a master station and the simultaneous transmission and reception of intelligence made possible.

Other objects and advantages of the present invention will readily occur to those skilled in the art to which the same relates.

What is claimed is:

1. In a radio communication system: a plurality of simultaneously operable means for locally generating a plurality of carrier waves each having a different frequency; a plurality of wave guides, receptive of said carrier waves, connected, respectively, to said carrier-wave generators; a single radiator-receiver adapted simultaneously to transmit and receive electromagnetic energy; a plurality of electromagnetically isolated wave-guide sections connected, respectively, to said waveguides, and connecting said waveguides to said single radiator-receiver; means for modulating one of said locally-generated carrier waves with locally-generated intelligence adapted to be transmitted by said radiator-receiver; means for mixing the other of said locally-generated carrier waves with a remotely-generated carrier wave received by said radiator-receiver to derive therefrom a sub-carrier wave; and means for extracting any intelligence incorporated in said sub-carrier wave.

2. In a radio communication system: a plurality of means for locally generating a plurality of carrier waves each having a different frequency; a plurality of wave guides, receptive of said carrier waves, connected, respectively, to said carrier-wave generators; means for terminating said wave guides in a single radiator-receiver adapted to transmit and receive electromagnetic energy, said means including a double T-shaped wave-guide section having a cross-arm common to both T's and a pair of branch arms perpendicular to said cross arm and each other, said branch arms being connected, respectively, to said wave guides and said cross-arm being connected at one end thereof to said radiator-receiver, the opposite end being terminated in a load matched to said radiator receiver; means for modulating one of said locally-generated carrier waves with locally-generated intelligence adapted to be transmitted by said radiator-receiver; means for mixing the other of said locally-generated carrier waves with a remotely-generated carrier wave received by said radiator-receiver, to derive therefrom a sub-carrier wave; and means for extracting any intelligence incorporated in said sub-carrier wave.

3. In a radio communication system: a plurality of means for locally generating a plurality of carrier waves each having a different frequency; a plurality of wave guides, receptive of said carrier waves, connected, respectively, to said carrier-wave generators; means for terminating said wave guides in a single radiator-receiver adapted to transmit and receive electromagnetic energy; means for modulating the carrier wave of one of said generators with locally-generated intelligence adapted to be transmitted by said radiator-receiver, said means including a microphone connected to an audio-frequency transformer, the output of said transformer being applied to said carrier-wave generator, whereby said output is caused to modulate the carrier wave of said generator; means for mixing the other of said locally-generated carrier waves with a remotely-generated carrier wave received by said radiator-receiver to derive therefrom a sub-carrier wave; and means for extracting any intelligence incorporated in said sub-carrier wave.

4. In a radio communication system: a plurality of simultaneously operable means for locally generating a plurality of carrier waves each having a different frequency; a plurality of wave guides, receptive of said carrier waves, connected, respectively, to said carrier-wave generators; a single radiator-receiver adapted simultaneously to transmit and receive electromagnetic energy; a plurality of electromagnetically isolated wave-guide sections connected, respectively, to said waveguides, and connecting said waveguides to said single radiator-receiver; means for modulating one of said locally-generated carrier waves with locally generated intelligence adapted to be transmitted by said radiator-receiver; means for mixing the other of said locally-generated carrier waves with a remotely-generated carrier wave received by said radiator-receiver, to derive therefrom a sub-carrier wave, said means including a nonlinear impedance device disposed in the wave guide containing said locally and remotely-generated carrier waves; and means for extracting any intelligence incorporated in said sub-carrier wave.

5. In a radio communication system: a plurality of means for locally generating a plurality of carrier waves each having a different frequency; a plurality of wave guides, receptive of said carrier waves, connected, respectively, to said carrier-wave generators; a single radiator-receiver adapted to transmit and receive electromagnetic energy; a plurality of electromagnetically isolated waveguide sections connected, respectively, to said waveguides, and connecting said waveguides to said single radiator-receiver; means for modulating one of said locally-generated carrier waves with locally generated intelligence adapted to be transmitted by said radiator-receiver; means for mixing the other of said locally-generated carrier waves with a remotely-generated carrier wave received by said radiator-receiver to derive therefrom an intermediate-frequency wave; a tuned circuit receptive of said remotely-generated carrier wave; said circuit being disposed between said last-named mixing means and said radiator-receiver, whereby said circuit serves to isolate from said mixing means the first-named locally-generated carrier wave; and means for extracting any intelligence incorporated in said intermediate-frequency wave.

GEORGE G. BRUCK.
ROBERT M. SPRAGUE.
MALCOLM C. VOSBURGH.

REFERENCES CITED

The following references are of record in the file of this patent:

UNITED STATES PATENTS

| Number | Name | Date |
|---|---|---|
| 2,235,010 | Chaffee | Mar. 18, 1941 |
| Re. 21,955 | Chaffee | Nov. 25, 1941 |
| 2,364,371 | Katzin | Dec. 5, 1944 |
| 2,401,717 | Wolff et al. | June 4, 1946 |
| 2,412,935 | Tashjian | Dec. 17, 1946 |
| 2,416,790 | Barrow | Mar. 4, 1947 |
| 2,424,156 | Espley | July 15, 1947 |
| 2,426,581 | Atkins | Sept. 2, 1947 |
| 2,436,828 | Ring | Mar. 2, 1948 |
| 2,445,896 | Tyrrell | July 27, 1948 |